United States Patent
Taylor et al.

(10) Patent No.: US 7,723,654 B2
(45) Date of Patent: May 25, 2010

(54) APPARATUS FOR IN-SITU MICROWAVE CONSOLIDATION OF PLANETARY MATERIALS CONTAINING NANO-SIZED METALLIC IRON PARTICLES

(75) Inventors: Lawrence August Taylor, Lenoir City, TN (US); Donghwa Shin Taylor, Lenoir City, TN (US); Richard Franklin Perez, Bay Shore, NY (US); Michael A. DiGiuseppe, Milford, NJ (US)

(73) Assignees: Tranquility Base Incorporated, Lenoir City, TN (US); Northrop Grumman Systems Corporation, Los Angeles, CA (US)

( * ) Notice: Subject to any disclaimer, the term of this patent is extended or adjusted under 35 U.S.C. 154(b) by 410 days.

(21) Appl. No.: 11/477,253

(22) Filed: Jun. 29, 2006

(65) Prior Publication Data

US 2008/0003133 A1    Jan. 3, 2008

(51) Int. Cl.
*H05B 6/22* (2006.01)
*A61L 12/00* (2006.01)
*B09C 1/06* (2006.01)

(52) U.S. Cl. .................. 219/679; 422/21; 405/128.55

(58) Field of Classification Search .............. 219/679, 219/690, 695–697, 701, 745–750; 422/21; 405/128.55
See application file for complete search history.

(56) References Cited

U.S. PATENT DOCUMENTS

| | | | |
|---|---|---|---|
| 3,601,448 A * | 8/1971 | Stone | 299/14 |
| 4,857,266 A | 8/1989 | Sheinberg et al. | |
| 4,880,578 A | 11/1989 | Holcombe et al. | |
| 4,892,581 A | 1/1990 | Sheinberg et al. | |
| 5,397,530 A | 3/1995 | Narasimhan et al. | |

(Continued)

FOREIGN PATENT DOCUMENTS

JP    6-228912    *    8/1994    .................. 404/83

(Continued)

OTHER PUBLICATIONS

Meek et al., "Microwave Processing of Lunar Materials: Potential Applications", pp. 479-486, Lunar and Planetary Institute.

(Continued)

*Primary Examiner*—Daniel L Robinson
(74) *Attorney, Agent, or Firm*—Alan G. Towner, Esq.; Pietragallo Gordon Alfano Bosick & Raspanti, LLP

(57) ABSTRACT

An apparatus and method for on-site microwave consolidation of planetary regolith, soil and dust is disclosed. Such particulate materials may be converted into useful products such as roadways and other construction materials. In one embodiment, a portable microwave generator and waveguide system is used to generate and direct microwaves to a lunar surface containing fine iron-containing particles to sinter and/or melt the particles. The portable system may be provided in the form of a lunar paver with a single or multiple waveguides arranged to direct sufficient microwave energy to the lunar surface to heat, sinter, melt, or otherwise consolidate the lunar soil into a solid mass suitable for use as a road or path. Other applications of this in-situ microwave heating process include the release of solar-wind implanted gases, extraction of polar water-ice, and production of oxygen.

21 Claims, 18 Drawing Sheets

U.S. PATENT DOCUMENTS

| | | | |
|---|---|---|---|
| 5,635,143 A * | 6/1997 | White et al. | 422/186.05 |
| 6,350,973 B2 * | 2/2002 | Wroe et al. | 219/680 |
| 7,007,872 B2 | 3/2006 | Yadav et al. | |
| 2002/0134399 A1 | 9/2002 | Taylor | |

FOREIGN PATENT DOCUMENTS

| | | | |
|---|---|---|---|
| JP | 2005-66451 | * | 3/2005 |

OTHER PUBLICATIONS

Meek et al., "Electromagnetic Energy Applied to and Gained from Lunar Materials", Proceedings of the First Lunar Development Symposium, Sep. 22-24, 1986.

Meek, "Proposed model for the sintering of a dielectric in a microwave field", Journal of Materials Science Letters, vol. 6, 1987, pp. 638-640.

Taylor et al., "Lunar Dust Problem: From Liability to Asset", 1st Space Exploration Conference: Continuing the Voyage of Discovery, Orlando, FL, Jan. 30-31, 2005.

Taylor et al., "Microwave Sintering of Lunar Soil: Properties, Theory, and Practice", Journal of Aerospace Engineering, vol. 18, No. 3, pp. 188-196.

Liu et al., "Unique Properties of Lunar Impact Glass: Simulating Nanophase Iron in Agglutinitic Glass", The American Mineralogist, submitted Jun. 28, 2006.

* cited by examiner

BSE

Fe Kα

APPARATUS FOR IN-SITU MICROWAVE CONSOLIDATION OF PLANETARY MATERIALS CONTAINING NANO-SIZED METALLIC IRON PARTICLES

FIELD OF THE INVENTION

The present invention relates to in-situ consolidation of planetary materials such as soil containing nano-sized metallic iron particles, and more particularly relates to an apparatus and method for in-situ sintering and/or melting of such particles. In one embodiment, lunar soil containing nanophase metallic iron particles may be consolidated in-situ to form a paved road or pathway, or to form other construction materials.

BACKGROUND INFORMATION

NASA and the Apollo astronauts who walked on the Moon have stated that one of the foremost problems to be solved before we return to the Moon concerns lunar dust. This fine (e.g., less than 20 microns) portion of the lunar soil makes up about 20 wt % of the total soil and is extremely clinging, abrasive, toxic and omnipresent. Many activities on the Moon are negatively affected by this dust. During the Apollo missions, it caused reduced movement in the joints of the astronauts' space suits and wore through layers of the Kevlar cloth of the suits. Its clinging nature caused the initially white suits to become dirty, thereby absorbing more black-body heat with each Moon walk. In the lunar module when the astronauts removed their helmets, they experienced distressing sensations from the dust in their eyes, noses, and throats. Equipment having moving parts and friction bearing surfaces exposed to the lunar dust may also be negatively affected. For example, it was found that boxes used to collect and return lunar samples to Earth were not tightly sealed due to the presence of lunar dust. In fact, all Apollo rock boxes leaked, most all the way from $10^{-12}$ torr to one atmosphere of Earth air.

It would be desirable to mitigate such dust problems by converting the dust into roadways or other useful construction materials. In so doing, the amount of dust that the various activities on the Moon would normally generate would be held to a minimum.

SUMMARY OF THE INVENTION

The present invention provides an apparatus and method for on-site microwave consolidation of planetary material, such as lunar soil and its dust component, in order to convert the grains into useful articles such as roadways and other construction materials. In one embodiment, a portable microwave generator and waveguide system is used to generate and direct microwaves to a surface containing nanophase metallic iron-containing particles to sinter and/or melt the particles. The portable system may be provided in the form of a lunar paver with a single or multiple waveguides arranged to direct sufficient microwave energy to the lunar surface to heat and consolidate the lunar soil particles into a solid mass suitable for use as a road or path.

An aspect of the present invention is to provide an apparatus for in-situ microwave consolidation of soil particles. The apparatus comprises a microwave generator, and a waveguide structured and arranged to direct microwave energy from the microwave generator to a surface comprising the soil particles. The apparatus may be used to consolidate the soil particles in-situ.

Another aspect of the present invention is to provide an apparatus for paving a surface comprising soil particles. The apparatus comprises a frame, a microwave generator mounted on the frame, a waveguide structured and arranged to direct microwave energy from the microwave generator to a surface comprising the soil particles, and means for moving the waveguide with respect to the surface.

The apparatus may be used to consolidate the soil particles in-situ to form a roadway.

A further aspect of the present invention is to provide a method of in-situ microwave consolidation of soil particles. The method comprises generating microwave energy, and directing the microwave energy to a surface comprising the soil particles to thereby consolidate the soil particles in-situ.

These and other aspects of the present invention will be more apparent from the following description.

BRIEF DESCRIPTION OF THE DRAWINGS

FIG. 13 illustrates initial heating of the particles.

FIG. 14 illustrates the presence of a liquid phase and the occurrence of solid state diffusion.

FIG. 15 illustrates a combination of solid state and liquid-phase sintering.

FIG. 16 also includes micrographs of the sample heated to different temperatures.

DETAILED DESCRIPTION

Figure 1:
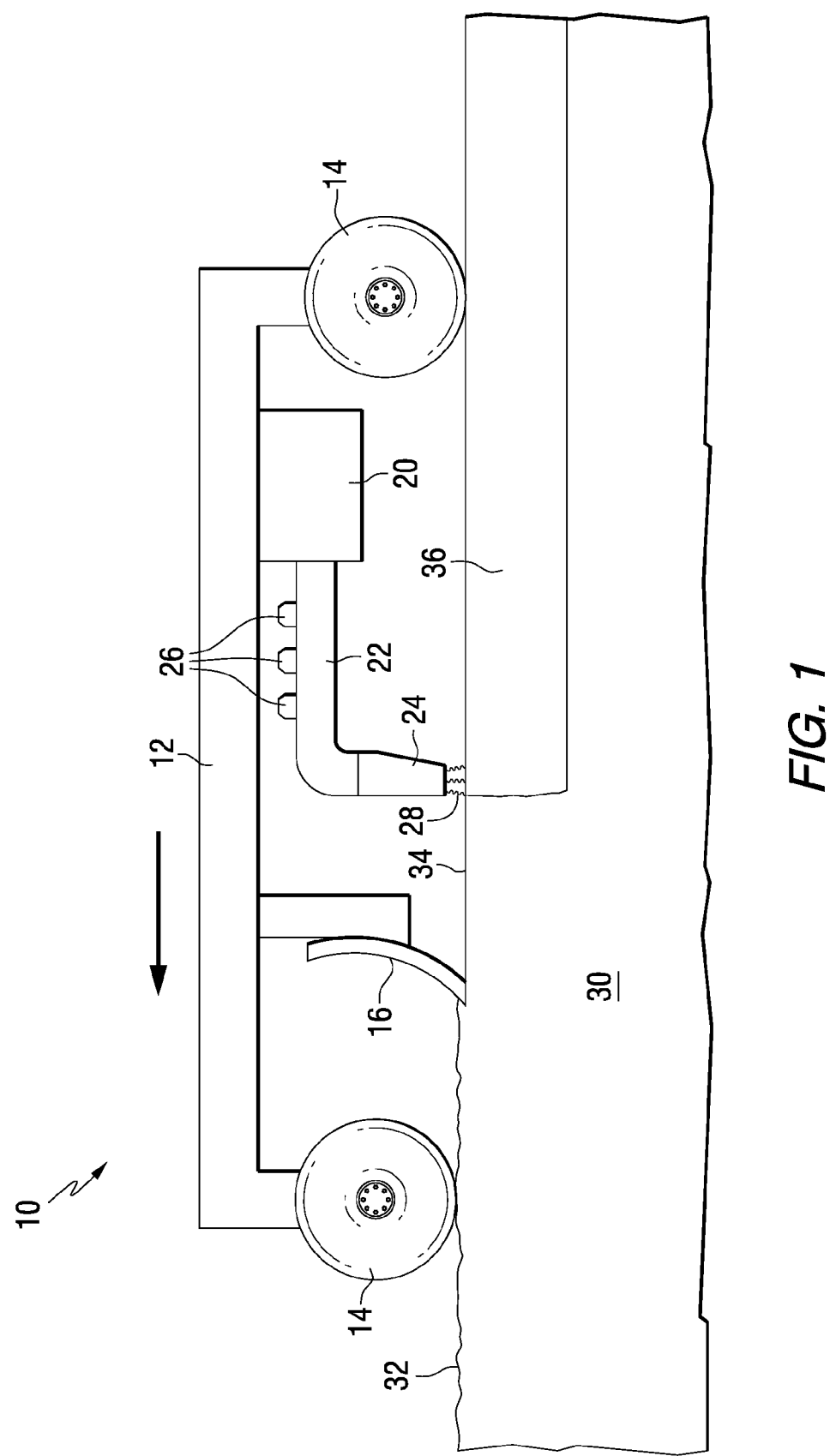
FIG. 1 is a partially schematic side view of a portable microwave paver including a microwave generator, waveguide, and funnel for directing microwaves to a particulate surface in order to consolidate the particles into a roadway in accordance with an embodiment of the present invention.

FIG. 1 schematically illustrates an in-situ microwave paver 10 in accordance with an embodiment of the present invention. The microwave paver 10 includes a frame 12 supported by wheels 14. A grading blade 16 is suspended from the frame 12 between the wheels 14. Also supported by the frame 12 is a microwave generator 20 such as a magnetron connected to a microwave waveguide 22 and a microwave funnel 24. Three impedance tuners 26 are mounted on the waveguide 22. As more fully described below, the microwave generator 20, waveguide 22 and microwave funnel 24 generate and direct microwave energy 28 from the paver 10 to a particulate surface 30 upon which the paver 10 travels in the direction of the arrow shown in FIG. 1. The paver 10 may include an on-board motor (not shown) or may be pulled or pushed manually or by a separate motorized device in order to move the paver 10. The particulate surface may naturally have a relatively rough or uneven surface 32 which is smoothed and leveled 34 as the grading blade 16 passes over the surface. The smoothed particulate surface 34 is then subjected to the microwave energy 28 directed from the microwave funnel 24 as the paver 10 passes over the surface. As more fully described below, the microwave energy 28 heats the particulate surface 34 in order to consolidate the particles into a sintered surface layer 36 which may then be used as a roadway, pathway or other construction material.

The microwave generator 20 shown in FIG. 1 may be of any suitable design capable of generating the desired microwave frequencies and power levels. For example, the microwave generator 20 may comprise a standard 2.45 GHz magnetron, e.g., commercially available from Toshiba or other suppliers. Any suitable power source such as batteries, solar panels and/or an electrical line from a separate power generator may be used to power the microwave generator 20.

As shown in FIG. 1, a waveguide 22 is connected to the output end of the microwave generator 20. The dimensions and shape of the waveguide 22 are selected based upon the microwave frequency to be directed through the waveguide. The waveguide 22 may be made of any suitable material such as aluminum, copper, iron or other microwave reflecting materials. The waveguide 22 may have a rigid shape, or may be flexible.

As shown in FIG. 1, a microwave funnel 24 is connected to the waveguide 22 in order to direct and focus the microwave energy 28 toward the particulate surface 30 to be consolidated. The microwave funnel 24 may be made of any suitable material such as aluminum, copper, iron or other microwave reflecting materials.

As further shown in FIG. 1, a three-stub impedance tuner 26 is provided in the waveguide 22. The impedance tuner 26 comprises small metal rods, each with its own positioning dial, which are suspended in the waveguide chamber so as to interfere with the shape (i.e., magnetic and electric components) of the microwave as it moves down the waveguide column. By adjusting the rods, it is possible to shape the wave so as to maximize the microwave energy that is coupling with the particulate material to be consolidated. As the temperature of the material rises and its dielectric changes, continuous tuning can maximize the efficiency of the microwave coupling. This may be accomplished with a small computer for maximum efficiency of coupling as the loss tangent increases rapidly with increasing temperature. Thus, during paving operations, continuous impedance tuning may be accomplished with the aid of a small on-board computer, providing efficient performance for the microwave waveguide assemblies.

Figure 2:
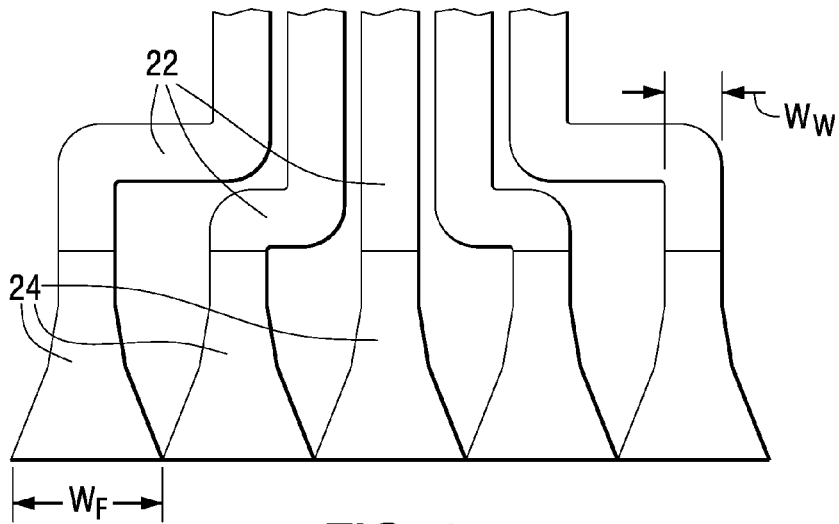
FIG. 2 is a partially schematic end view of an array of waveguides and microwave funnels in accordance with an embodiment of the present invention.
Figure 4:
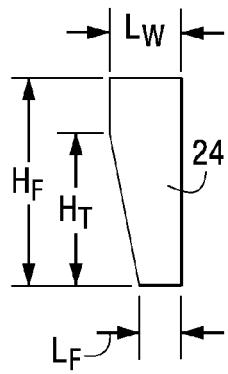
FIG. 4 is a side view of one of the microwave funnels of FIG. 2.
Figure 3:
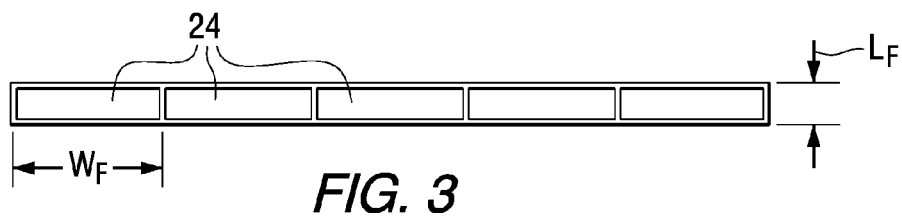
FIG. 3 is a bottom view of the microwave funnel array of FIG. 2.

FIGS. 2-4 illustrate a waveguide and microwave funnel assembly in accordance with an embodiment of the present invention. Five waveguides 22 and five corresponding microwave funnels 24 are provided. Each waveguide 22 has a cross-sectional width $W_W$ and a cross-sectional length $L_W$. As shown most clearly in FIG. 3, the opening of each microwave funnel 24 has a cross-sectional width $W_F$ and a cross-sectional length $L_F$. As shown in FIG. 4, each microwave funnel 24 has an overall height $H_F$ and a tapered portion having a height $H_T$. The dimensions $W_W$, $L_W$, $W_F$, $L_F$, $H_F$ and $H_T$ may be selected based upon the particular microwave frequency to be directed through the waveguides and funnels. For example, for a microwave frequency of 2.45 GHz (wavelength=12.2 cm), the waveguide width $W_W$ may be about 72 mm, the waveguide length $L_W$ may be about 43.2 mm, the microwave funnel width $W_F$ may be about 115 mm, the microwave funnel length $L_F$ may be about 21.6 mm, the overall funnel height $H_F$ may be about 190 mm, and the height of the tapered portion of the funnel $H_T$ may be about 100 mm. In the embodiment shown in FIGS. 2-4, the total width of the five microwave funnels 24 is about 575 mm. However, any other desired total width may be achieved by adding or subtracting the number, size and/or spacing of waveguides and microwave funnels.

Although the arrangement shown in FIGS. 2-4 includes a single row of microwave funnels positioned end-to-end, any other suitable configuration may be used. For example, multiple rows of microwave funnels may be provided, either in line with the funnels in adjacent rows or staggered. Within an individual row, the funnels may be positioned directly adjacent to each other, or spaced apart. The microwave funnels used in array may all be the same shape, or they may have different shapes, dictated by the physics of the microwave frequency and the efficiency that can be tolerated.

Figure 5:
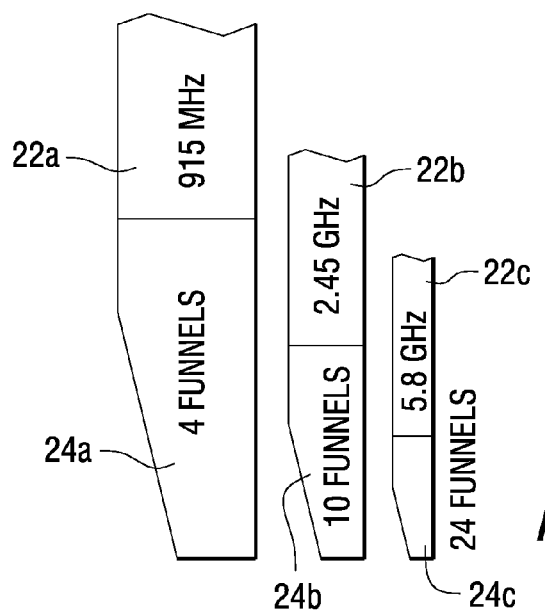
FIG. 5 is a partially schematic side view of an assembly of three microwave funnels having different sizes adapted for different microwave frequencies in accordance with an embodiment of the present invention.

FIG. 5 illustrates a waveguide and microwave funnel assembly comprising three different sizes adapted to handle different microwave frequencies in accordance with an embodiment of the present invention. In the embodiment shown in FIG. 5, a relatively large waveguide 22*a* and microwave funnel 24*a* is used for relatively low microwave frequencies (e.g., 915 MHz), a medium-sized waveguide 22*b* and microwave funnel 24*b* is used for intermediate microwave frequencies (e.g., 2.45 GHz), and a relatively small waveguide 22*c* and microwave funnel 24*c* is used for relatively high frequencies (e.g., 5.8 GHz). In the embodiment shown in FIG. 5, the assembly may comprise a row of four of the large microwave funnels 24*a*, ten of the mid-sized funnels 24*b*, and twenty-four of the small funnels 24*c*.

Figure 6:
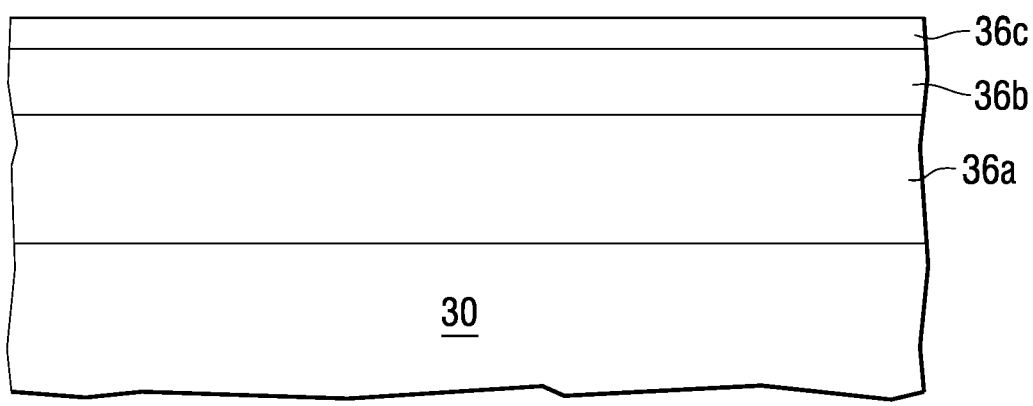
FIG. 6 is a partially schematic sectional side view of a particulate surface that has been consolidated to varying degrees at different depths by the application of different microwave frequencies in order to produce a graded surface layer structure in accordance with an embodiment of the present invention.

By providing three rows of different waveguides and microwave funnels as shown in FIG. 5, each row may interact with the particulate surface, such as lunar soil, to different depths and degrees. For example, the row of four 915 MHz waveguides and funnels may sinter the lunar soil to a depth of about 0.4 m; the row of ten 2.45 GHz waveguides and funnels may sinter/melt the lunar soil to an intermediate depth of 0.1 m; and the third row of twenty-four 5.8 GHz waveguides and microwave funnels may completely melt the top-most layer to a depth of about 0.025 m (~1 inch) that, upon cooling, forms a glass upper surface layer. An example of such a graded surface structure is illustrated in FIG. 6 in which the particulate surface 30 has been sintered and/or melted to form a graded surface structure comprising multiple layers 36a, 36b and 36c.

Figure 7:
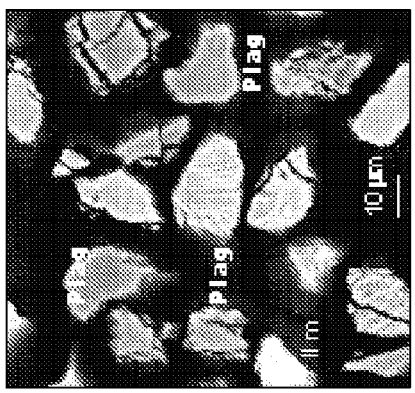
FIG. 7 is a back-scattered electron (BSE) image of Apollo 17 lunar soil.
Figure 8:
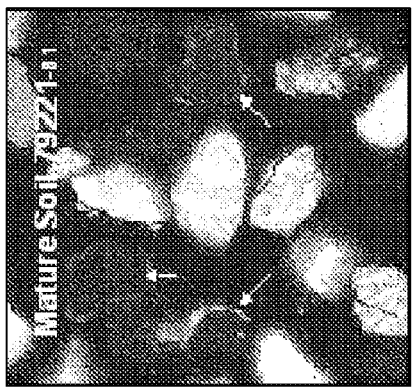
FIG. 8 is an Fe X-ray map of the same soil illustrating the thin rim of metallic Fe on some of the soil grains.
Figure 9:
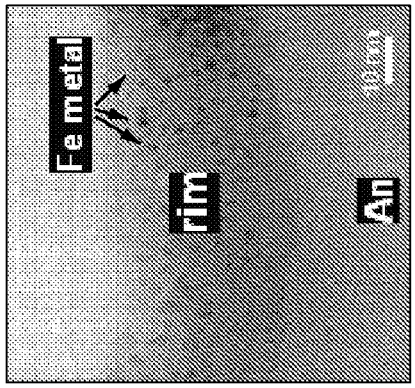
FIG. 9 is a TEM image of the same mature lunar soil sample, illustrating the presence of nano-phase metallic iron particles (np-Fe$^0$) on the surfaces of the soil grains.

FIG. 7 is a back-scattered electron image, FIG. 8 is an Fe X-ray map, and FIG. 9 is a TEM image of a mature lunar soil sample, Apollo 17 Sample No. 79221, illustrating the presence of nanophase metallic iron particles (np-Fe$^0$) on the surface of each soil particle.

Figure 10:
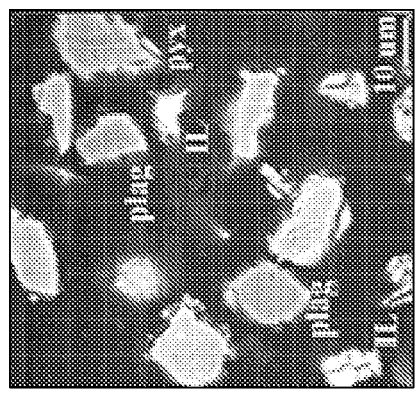
FIG. 10 is a BSE image of Apollo 17 lunar soil.
Figure 11:
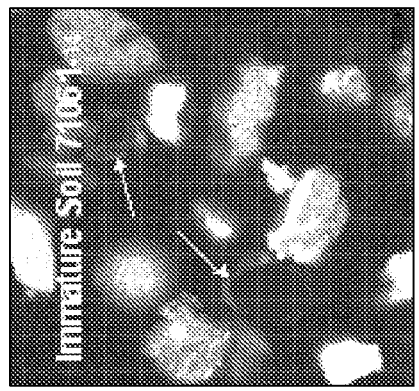
FIG. 11 is an Fe X-ray map of the same soil showing the thin rim of metallic Fe on some grains.
Figure 12:
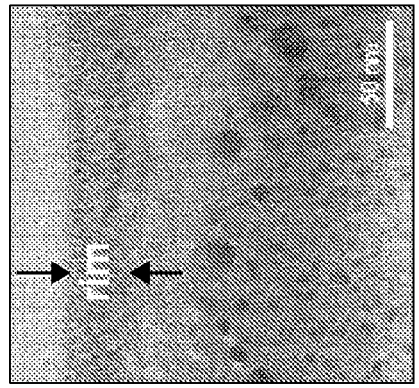
FIG. 12 is a TEM image of the same immature lunar soil sample, illustrating the presence of nanophase metallic Fe (np-Fe$^0$) on the surface of each soil particle.

FIG. 10 is a back-scattered electron image, FIG. 11 is an Fe X-ray map, and FIG. 12 is a TEM image of an immature lunar soil sample, Apollo 17 Sample No. 71061, illustrating the presence of nanophase metallic iron particles (np-Fe$^0$) on the surface of each soil particle.

As shown in the back-scattered electron images of FIGS. 7 and 10, there are many plagioclase grains (CaAl$_2$Si$_2$O$_8$), as well as ilmenite (FeTiO$_3$) grains. In the Fe X-ray maps of FIGS. 8 and 11, a thin Fe rim is present on the plagioclase grains, giving them a significant bulk magnetic susceptibility. Both the mature (FIG. 8) and immature (FIG. 11) lunar soils have vapor-deposited coatings on rims of most grains. In the TEM images of FIGS. 9 and 12, the fine-grained nature of the nanophase Fe$^0$ on the plagioclase grains is shown.

Lunar soil, especially lunar agglutinitic glass which is a major component in lunar dust, contains nano-sized metallic Fe (np-Fe$^0$). The np-Fe$^0$ typically has a size of less than 50 nm for example, from 3 to 30 nm. Such a np-Fe$^0$ may pose severe problems for humans and equipment. However, the presence of np-Fe$^0$ in combination with a dielectric glass matrix allows the lunar soil to be heated to high temperatures (e.g., >1,200° C.) utilizing microwave radiation. In-situ microwave heating, melting, and glassification of lunar soil will result in consolidation of the loose powders into useful solid forms, while also mitigating potential dust problems.

Figure 15:
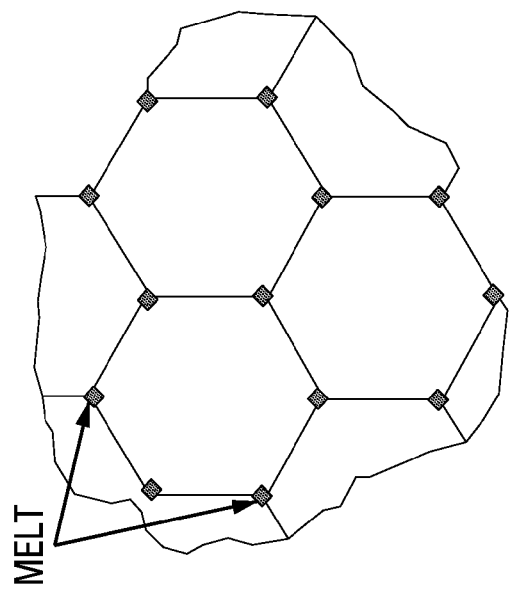
FIGS. 13-15 illustrate various stages of microwave particle consolidation.
Figure 14:
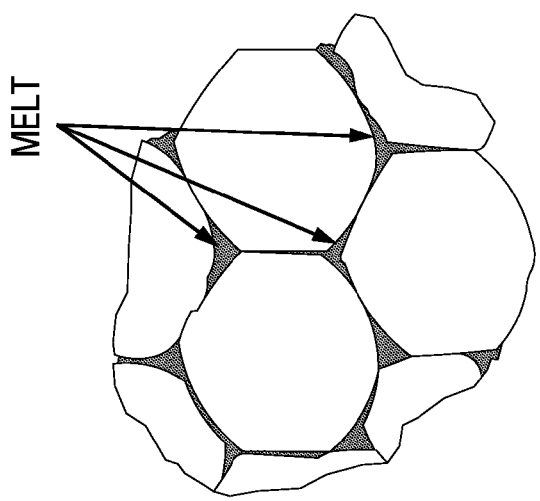
Figure 13:
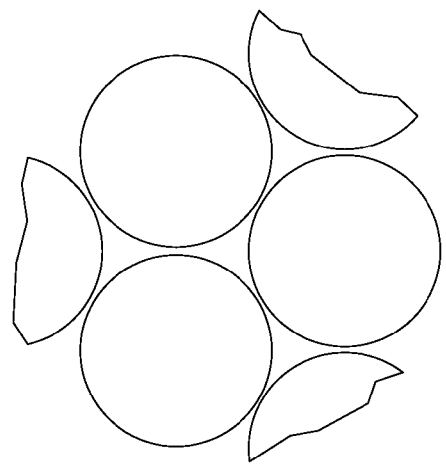

FIGS. 13-15 schematically illustrate the sintering progress of powder particles upon exposure to microwave energy. In FIG. 13, the initial heating of the particles is shown. In FIG. 14, a liquid phase is introduced and solid state diffusion occurs. In FIG. 15, a combination of solid state and liquid phase sintering occurs. While not intending to be bound by any particular theory, it is believed that a process similar to that shown in FIGS. 13-15 occurs when lunar soil is subjected to microwave energy. Microwave heating of lunar soil provides rapid heating rates (greater than 1,000° C./min.), high temperatures (2,000° C. or higher), enhanced reaction rates (faster diffusion rates), faster sintering kinetics (shorter sintering times), lower sintering temperature (energy savings), fine micro-structures (improved mechanical properties), considerably reduced processing time, simplicity, and reduced costs.

The presence of extensive amounts of np-Fe$^0$ on virtually all surfaces of lunar soil grains, as well as within the interiors of most of the lunar impact-generated glass, is particularly advantageous where the grain-size of a soil fraction is small (e.g., <45 μm), since the surface to volume ratio is large. It will be possible to easily smooth and sinter the soil in-situ by microwave heating. The np-Fe$^0$ will ripen and grow during this process, thereby adding significantly to the adhesion and strength of the consolidated aggregates. In addition, the np-Fe$^0$ is located within a silicate glass, which being inherently unstable, will readily create additional fusion of the particles to each other. The presence of this thin rim of np-Fe$^0$ on each grain can facilitate the formation of a fine-scale melt at the surface of these grains, thereby producing a glass binder, i.e., transient liquid-phase sintering. The discovery of the abundance of this nanophase native Fe$^0$ on the surface of lunar soil grains provides unique properties to lunar soil that make it an ideal feedstock for microwave processing.

An embodiment of the present invention utilizes microwave energy to heat and consolidate the fine powders that constitute the lunar soil in-situ. The microwave part of the electromagnetic spectrum corresponds to frequencies between 300 MHz and 300 GHz. However, most research and industrial activities involve microwaves only at 2.45 GHz and 915 MHz frequencies. Based on their microwave interaction, most materials can be classified into three categories—opaque, transparent, and absorbers. Bulk metals are opaque to microwaves and are good reflectors. Most other materials are either transparent or absorb microwaves to varying degrees at ambient temperatures, depending on the frequency of the microwave radiation.

It is known that solid, nonporous metal readily reflects and effectively "shorts out" conventional microwave ovens. However, the same metal in a powdered form, which effectively comprises conductors separated by dielectric (particle, glass, and air), will absorb microwaves at room temperature and will be heated effectively and rapidly. Lunar particles comprising silicate glass with np-Fe$^0$ embedded therein and thereon thus have a structure of a myriad of metal grains, each separated by a dielectric glass, which may be effectively heated by microwaves.

The heating that occurs in a microwave field depends on the local dielectric properties. For a simple monolithic material, the model is straightforward. However, as the number of phases increases, the model increases in complexity. Due to the differences in dielectric characteristics in a composite substance, each phase couples differently with the microwave energy, thereby developing local temperature conditions (inhomogeneities) in the material. It is possible to have solid-state sintering of particles and development of local melt pockets as well. Once a liquid phase is developed, then thermodynamic equilibrium and nucleation kinetics must be considered. Exactly how the electromagnetic field affects these thermo and kinetic factors becomes more complicated. But the combination of solid-state and liquid-phase sintering (transient liquid-phase sintering) can result in better mechanical properties.

Specific frequencies couple with particular materials such that they cause substantial heating. It is possible to have multiple microwave frequencies such that the energy can be coupled into different constituents of a given material.

Modeling for the sintering of a dielectric in a microwave field may involve the interactions of the electromagnetic radiation with matter and can be approximated by use of three basic components: power density; half-power depth; and heating rate. These characterize how a material, such as a ceramic, will heat in an electromagnetic field. The power deposited per unit volume into a dielectric media by an electromagnetic field is:

$$P = KfE^2 k' \tan \delta$$

where P=power per unit volume; K=constant; f=frequency of radiation; E=electric-field intensity; k'=relative dielectric constant; and tan δ=loss tangent.

The depth to which microwave energy will penetrate a substance is referred to as the skin depth (D$_S$) and is formulated as:

$$D_S = (1/2\pi\mu cf)^{1/2}$$

where D$_S$=depth (skin depth) of microwave energy penetration (centimeters); μ=magnetic permeability; c=electrical conductivity; and f=frequency. Since the size of the metallic np-Fe$^0$ grains suspended within the glass of lunar soil is sufficiently small, rather than reflecting the microwave energy, as large pieces of metallic Fe would, they react as small conductors with the absorption of the microwave energy.

The next equation allows us to determine the depth into the dielectric material where the power is half its value at the surface. This is called the half-power depth and is defined as:

$$D_H=3\lambda_0/[8.68\pi k' \tan \delta]$$

where $D_H$=half-power depth in centimeters; $\lambda_0$=wavelength of incident radiation; k'=relative dielectric constant; and tan δ=loss tangent. Thus, the half-power depth of penetration, $D_H$, varies as a function of regolith dielectric constant and temperature.

Another equation gives an approximate rate of temperature increase in a dielectric media that is heated in an electromagnetic field. This is only approximate because it does not include heat losses due to conduction, convection, radiation or change of state:

$$\Delta T \approx 8 \times 10^{-12} f E^2 k' \tan \delta / \rho C_P$$

where $\Delta T$=heating rate in °C./min; f=frequency; E=electric-field intensity; k'=relative dielectric constant; tan δ=loss tangent; ρ=density of material; and $C_P$=heat capacity.

From the foregoing heating model, it is apparent that for an applied frequency of 2.45 GHz (~$10^{-6}$ eV photon energy) at 500 K and for a regolith with a k' of 5, the power density is approximately 250 cal/cc. Initially, heating is dominated by the applied electric field, "E". Power density increases with the square of the electric-field intensity E. As temperature increases, a critical temperature is reached at which the dielectric loss tan δ becomes of primary importance in the ability to deposit energy into the material. The amount of energy deposited per unit volume increases as temperature increases. However, as the temperature increases, the half-power depth of penetration decreases. Initially at low temperature, 2.45 GHz microwave energy is easily deposited into a regolith depth of approximately 65 cm for a material dielectric constant of 3.5. At this depth, the power density is one-half that at the surface of the soil. The half-power depth of penetration decreases as temperature increases, and is a function of tan δ. As tan δ increases, H decreases. The shape of the half-power depth curve is the inverse of the power density curve. In order to increase H, microwave radiation of a longer wavelength (lower frequency) should be used. Recognizing that low frequency (2.45 GHz) microwave heating occurs predominately as dielectric heating and then becomes dominated by the dielectric loss of the material, the rate of temperature rise starts off slowly, but increases at a rate that is influenced by the dielectric loss of the regolith. The shape of the heating curve is also influenced by the loss tangent of the soil. As regolith temperature increases, the volume of material being heated decreases due to the decrease in H. This is not of primary importance because the initial volume is heated so rapidly that by the time the half-power depth decreases appreciably, the soil is already sintered. As regolith temperature increases, the rate of temperature rise ΔT increases. At a regolith temperature of 1,000° C., the heating rate of a soil with a dielectric constant of 5 is approximately 50° C./s. By increasing E, the heating rate can be markedly increased and sintering of the regolith can be accomplished very rapidly.

With a homogeneous distribution of two materials of contrasting dielectric constants in a composite, the lowest dielectric phase will have the highest electric field intensity. As sintering ensues, the density of this area increases in an attempt for the radiation to homogenize the dielectric constant. But as this occurs, more and more power is deposited into the lower-density regions with the lower dielectric phase. Once dense regions begin to form, the microwave field will begin to decouple from these regions and couple more strongly to the regions of low density and low dielectric constant. The net goal of the microwave field is to create a material with a uniform dielectric constant.

Inspection of the above-presented equations provides insight into the effects of microwave energy as temperature increases. In the equations for the power density and heating rate, the tan δ term is in the numerator, with the result that both the power density and heating rate increase dramatically as temperature increases. However, the half-power depth, where the loss tangent is in the denominator, decreases. These effects are at the center of the microwave heating, i.e., the power of the microwave energy becomes ever-more concentrated into a smaller volume as temperature increases. With this net effect, it is desirable that the frequency of radiation and the electric-field intensity be properly balanced such that the heating does go into a run away mode, which is not easily controlled.

Several experiments were conducted on lunar soil samples collected during the Apollo 17 mission. Such samples were successively exposed to higher temperatures, culminating with the complete melting of the lunar soil, which upon cooling forms dendritic skeletal crystals of ilmenite (Fe-$TiO_3$). The temperatures measured within the microwave chamber were done by optical pyrometers, since a thermocouple would introduce metal into the microwave system, effecting the wave.

Figure 16:
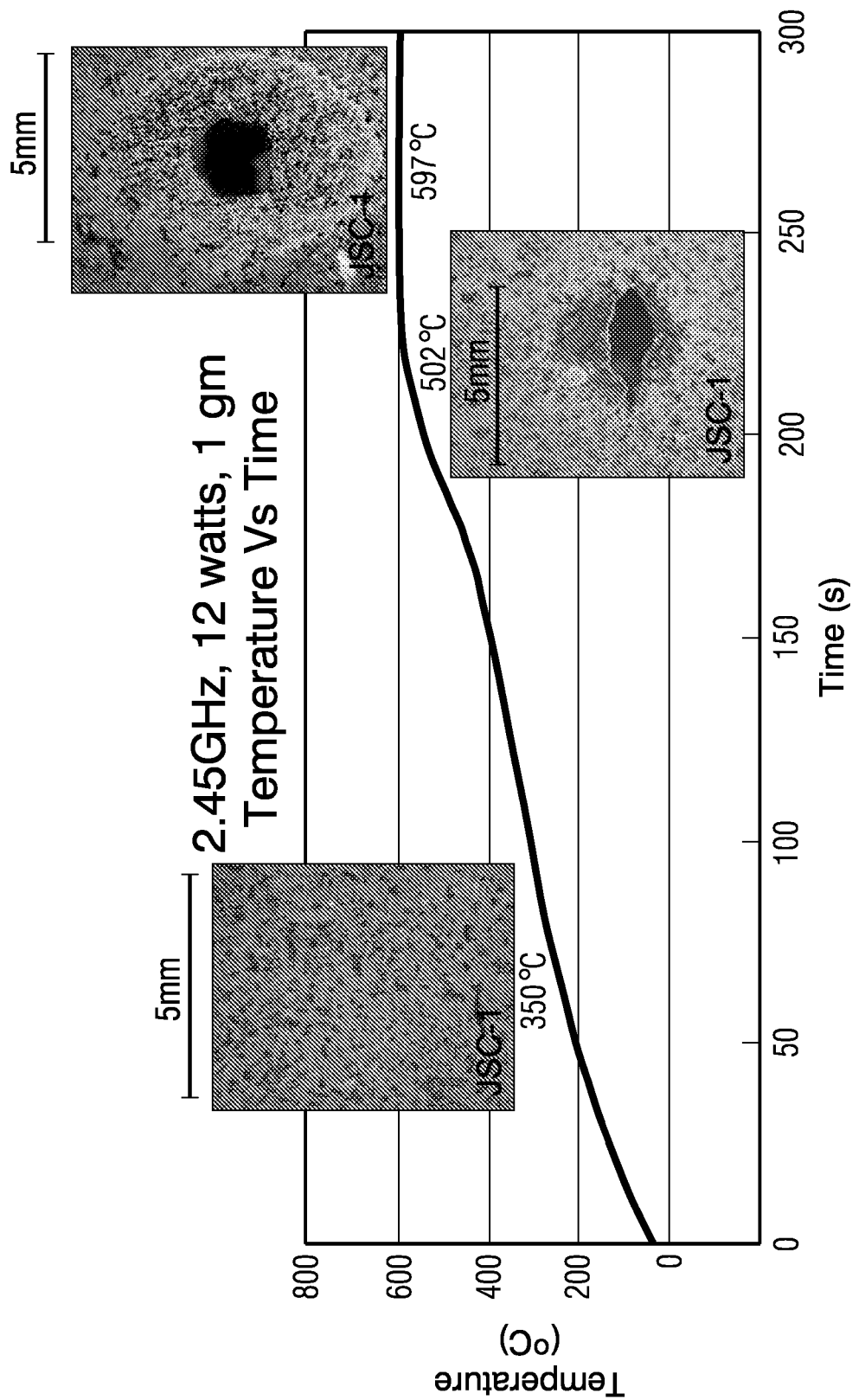
FIG. 16 is a graph of temperature versus time for a sample of lunar soil, Apollo 17 sample 70051, subjected to microwave energy.

FIG. 16 is a graph of temperature versus time for a one-gram lunar sample subjected to a microwave frequency of 2.45 GHz at a power rating of 12 watts. Also shown in FIG. 16 are micrographs of samples which reached temperatures of 350° C., 502° C. and 597° C. The temperatures determined by optical pyrometry are of the average external portion of the charge. The microwave energy heats from the "inside-out", thereby producing temperatures two to three times higher in the centers of the charges, facilitating melting.

Figure 17:
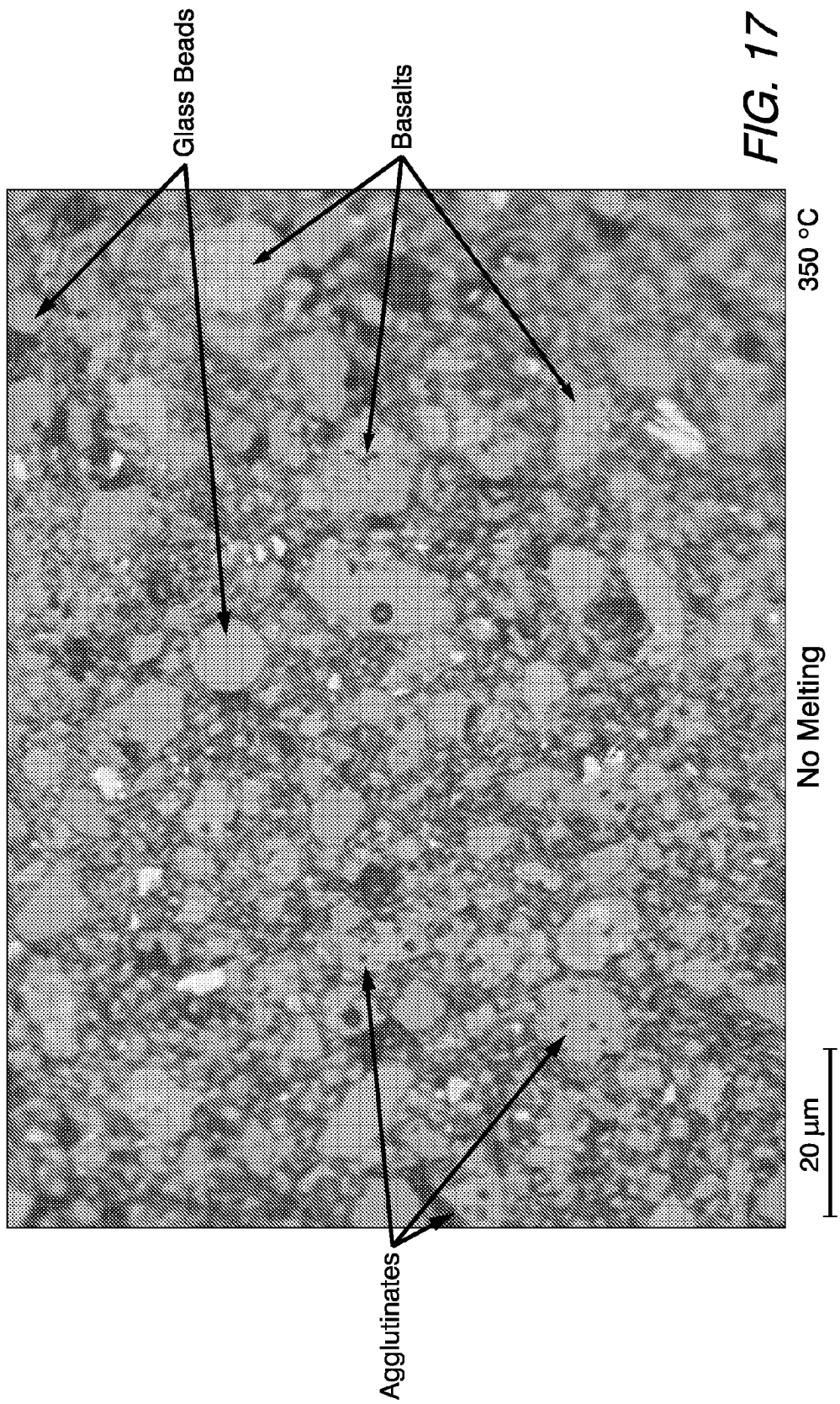
FIGS. 17-27 are photomicrographs of lunar soil samples heated to different temperatures.
Figure 18:
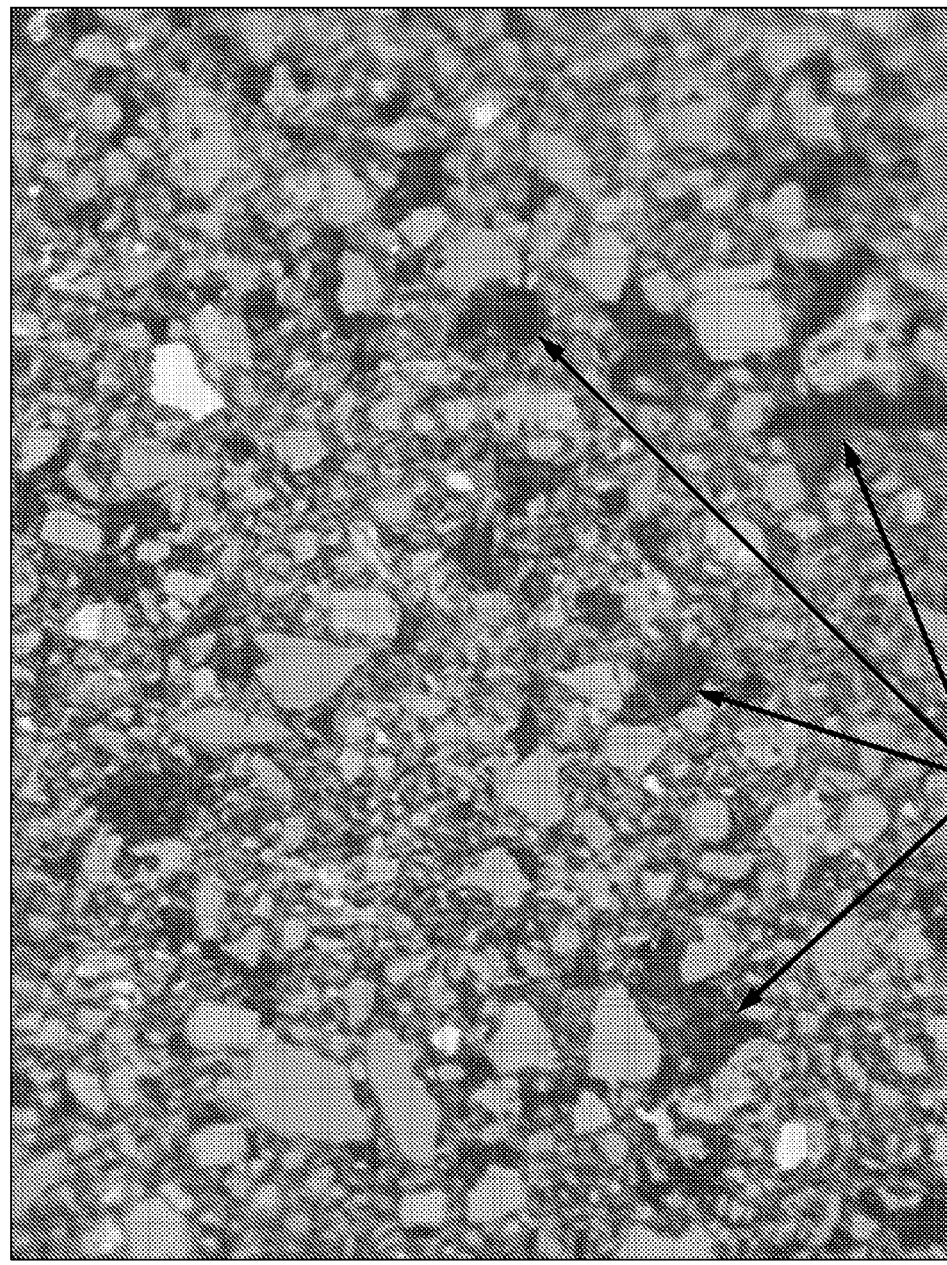
Figure 19:
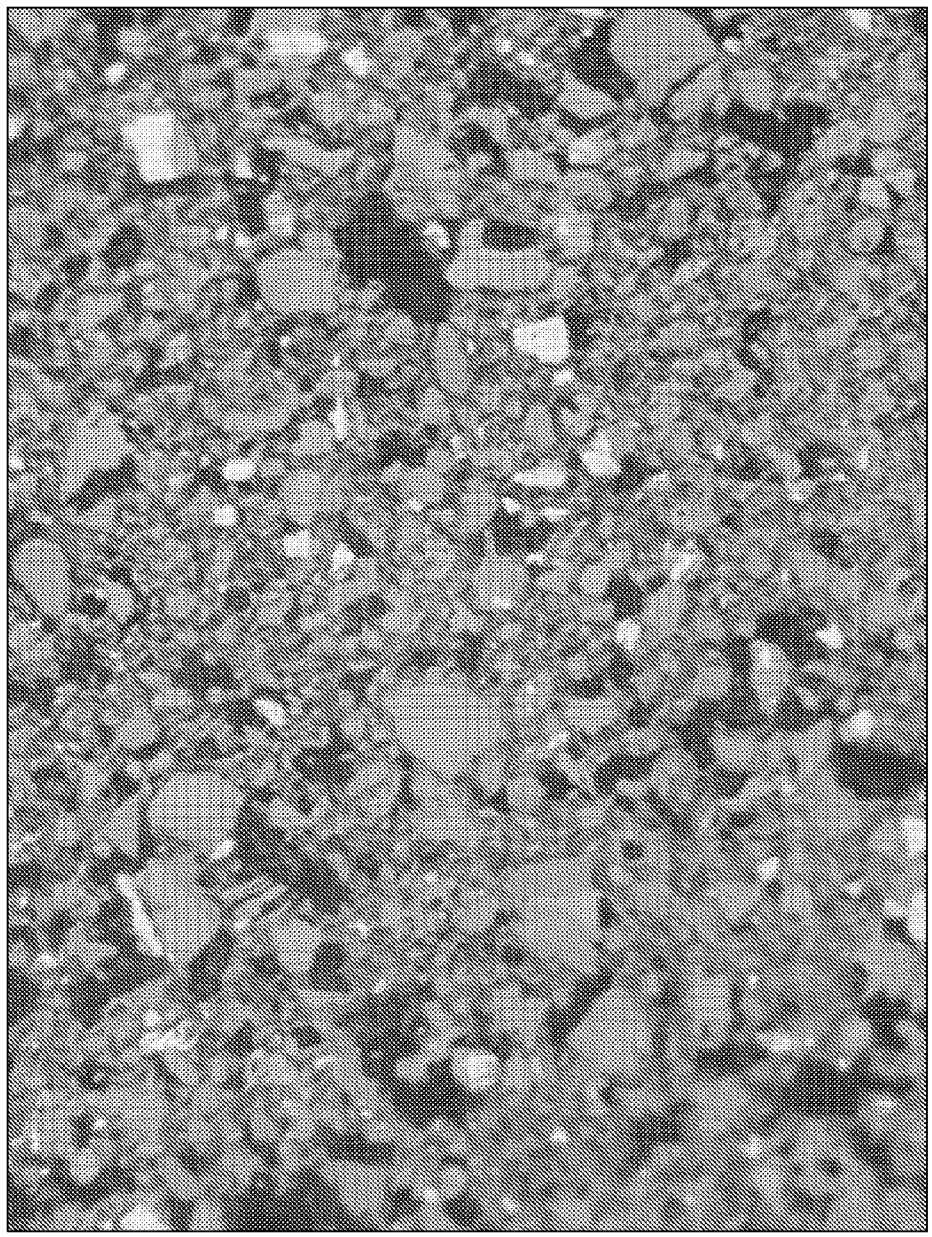
Figure 20:
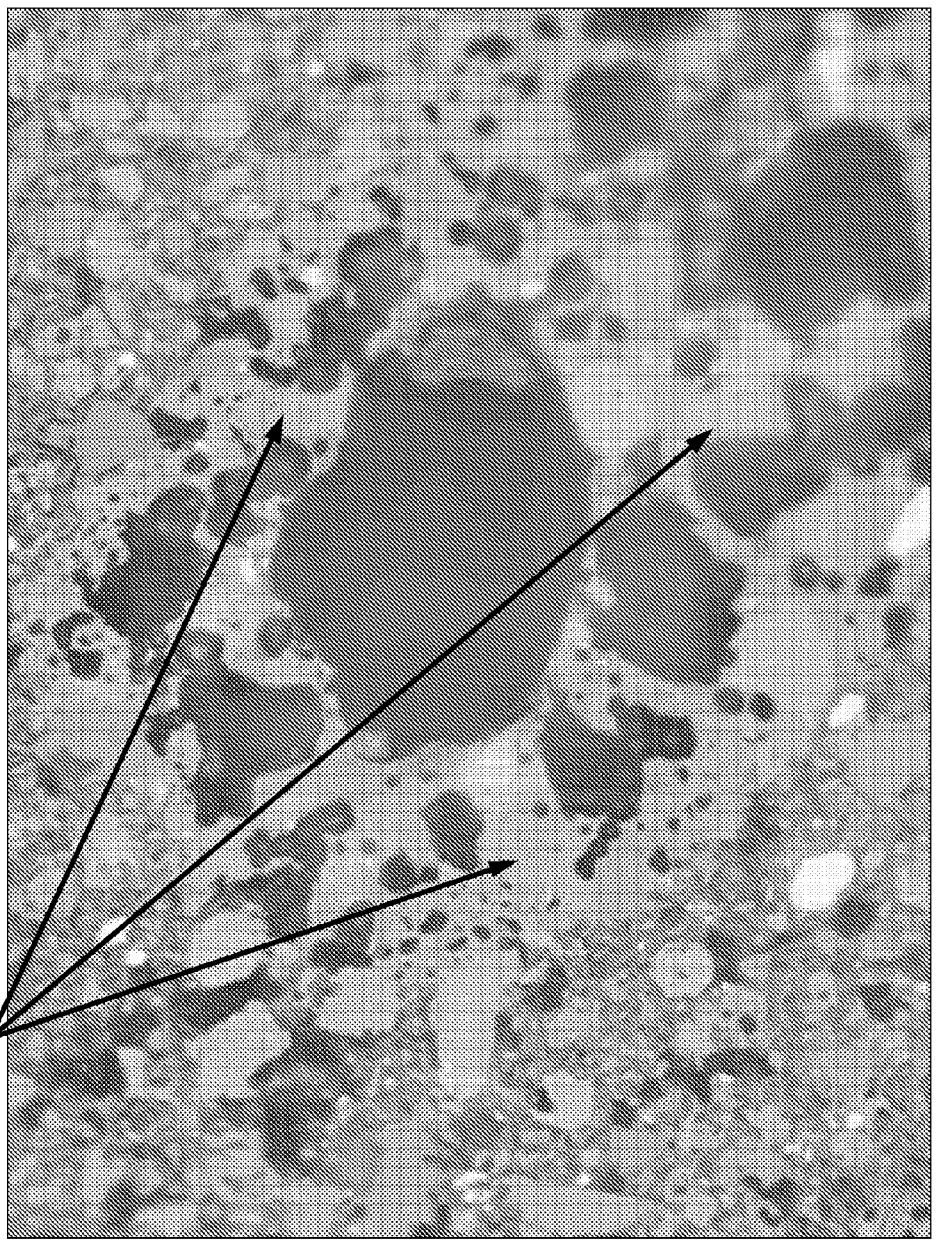
Figure 21:
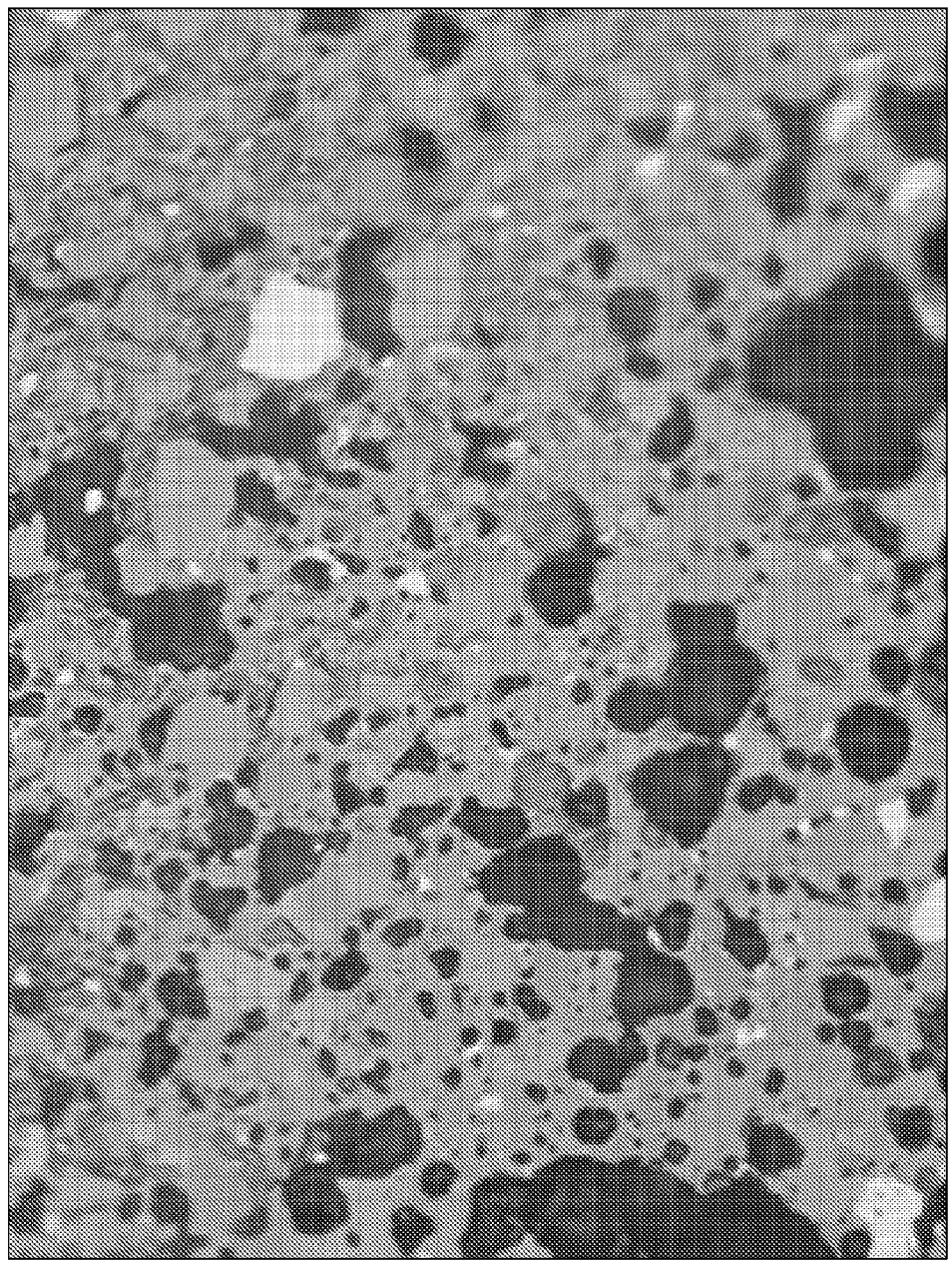
Figure 22:
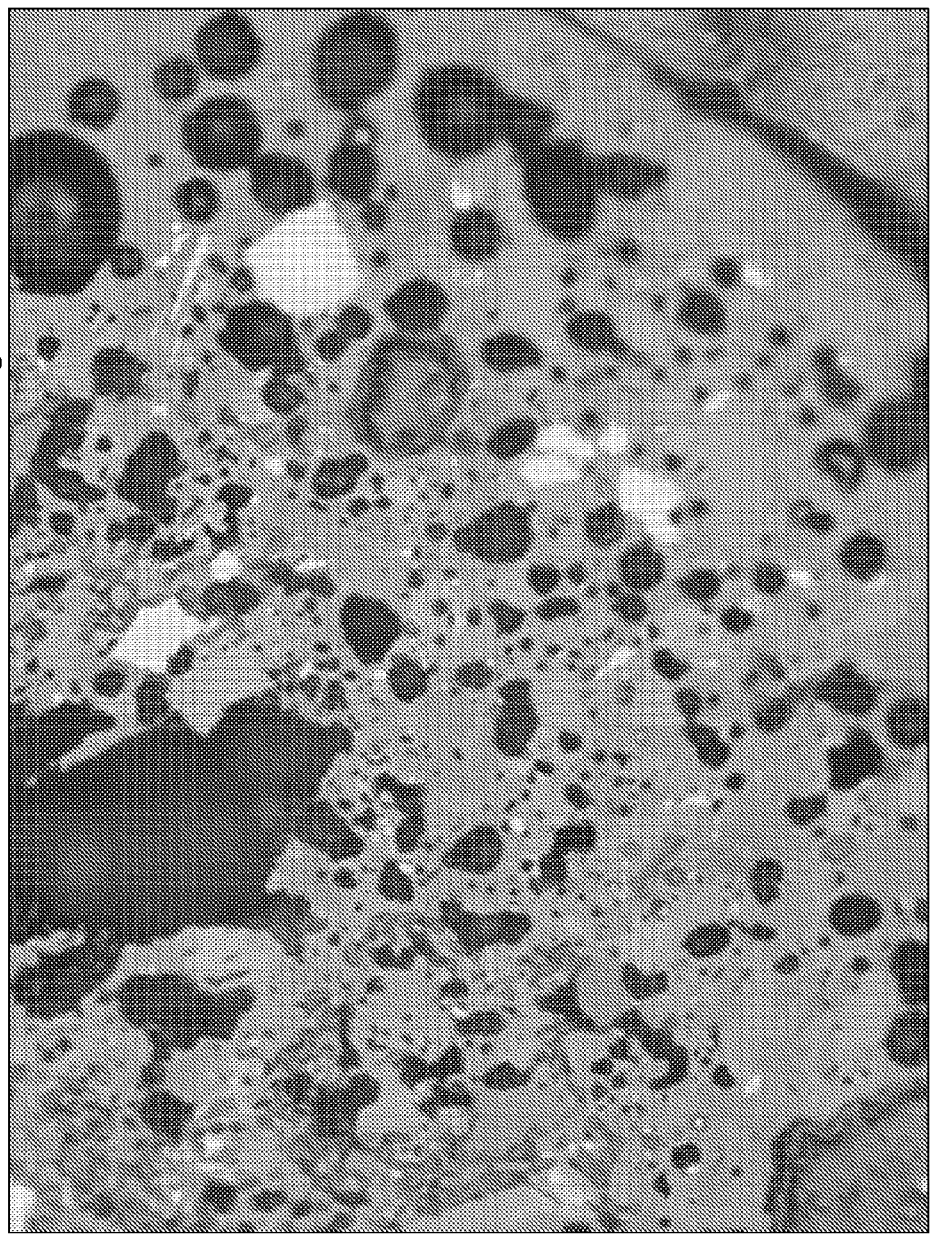
Figure 23:
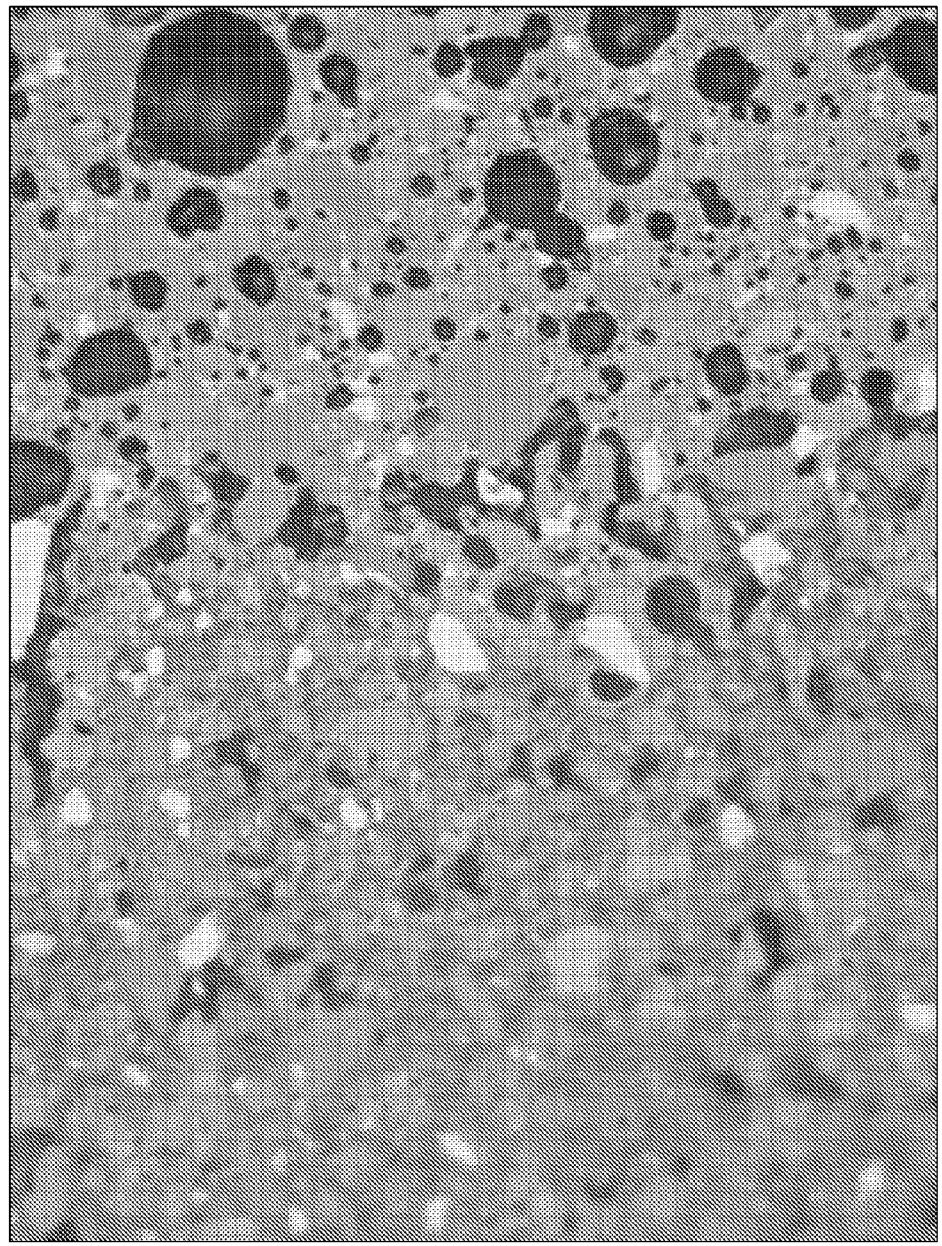
Figure 24:
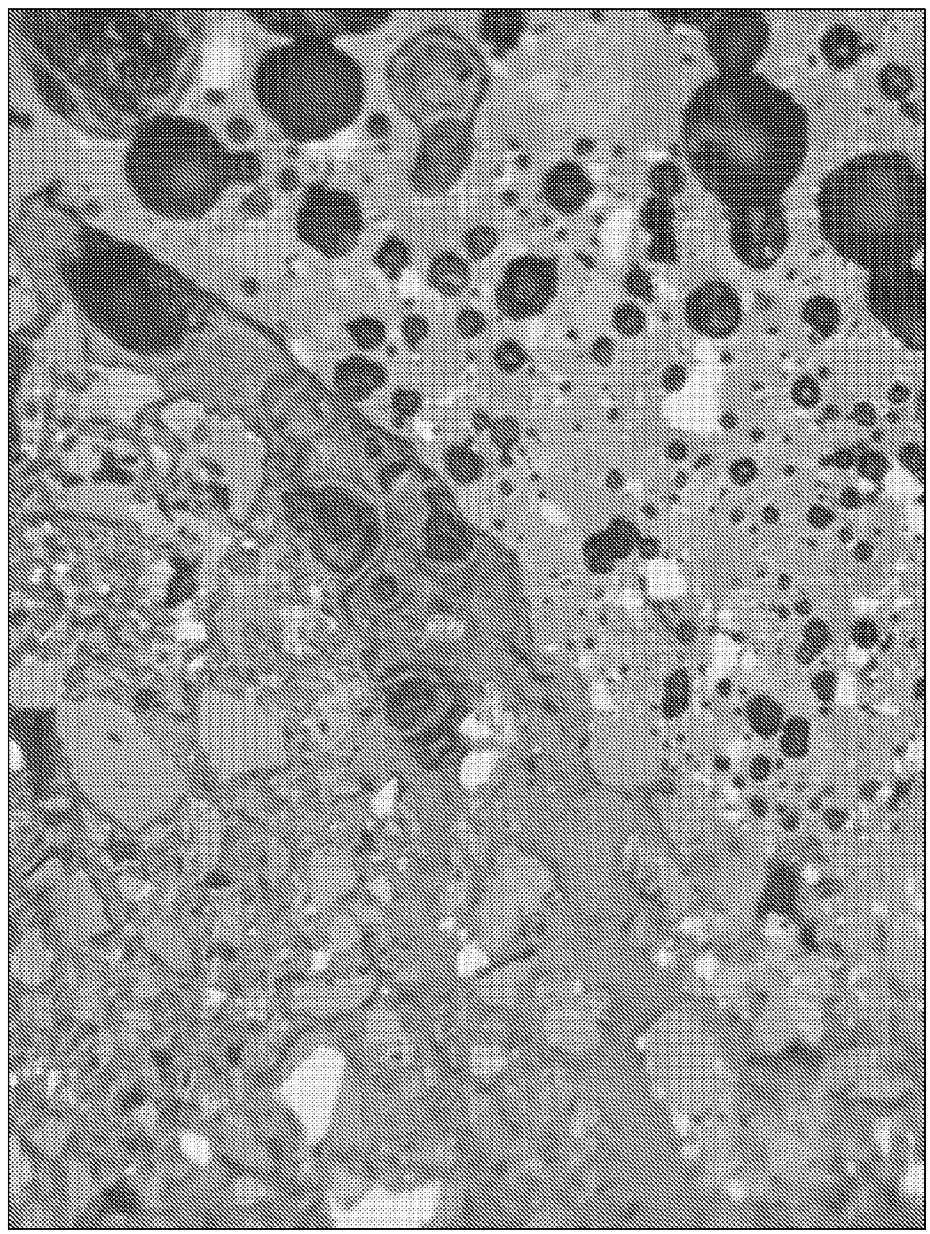
Figure 25:
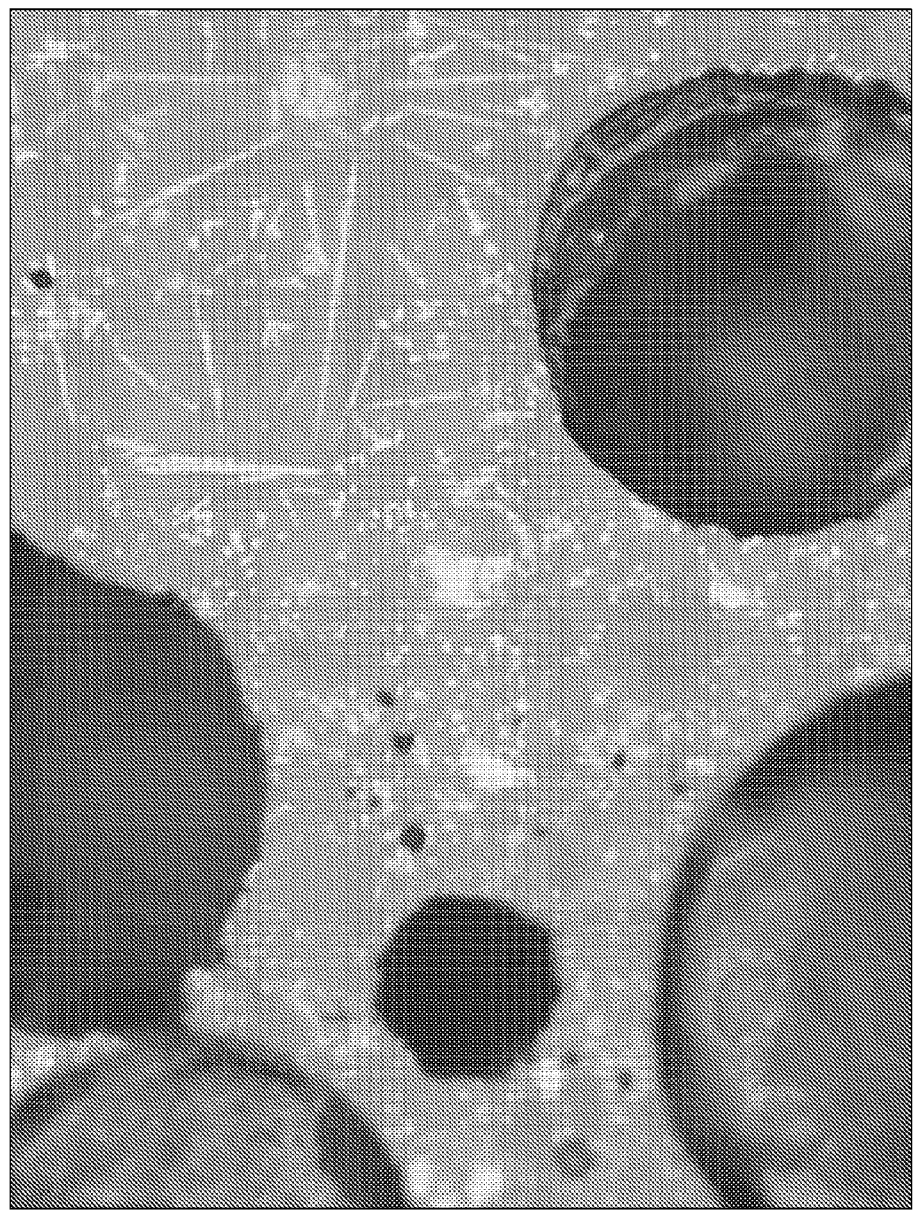
Figure 26:
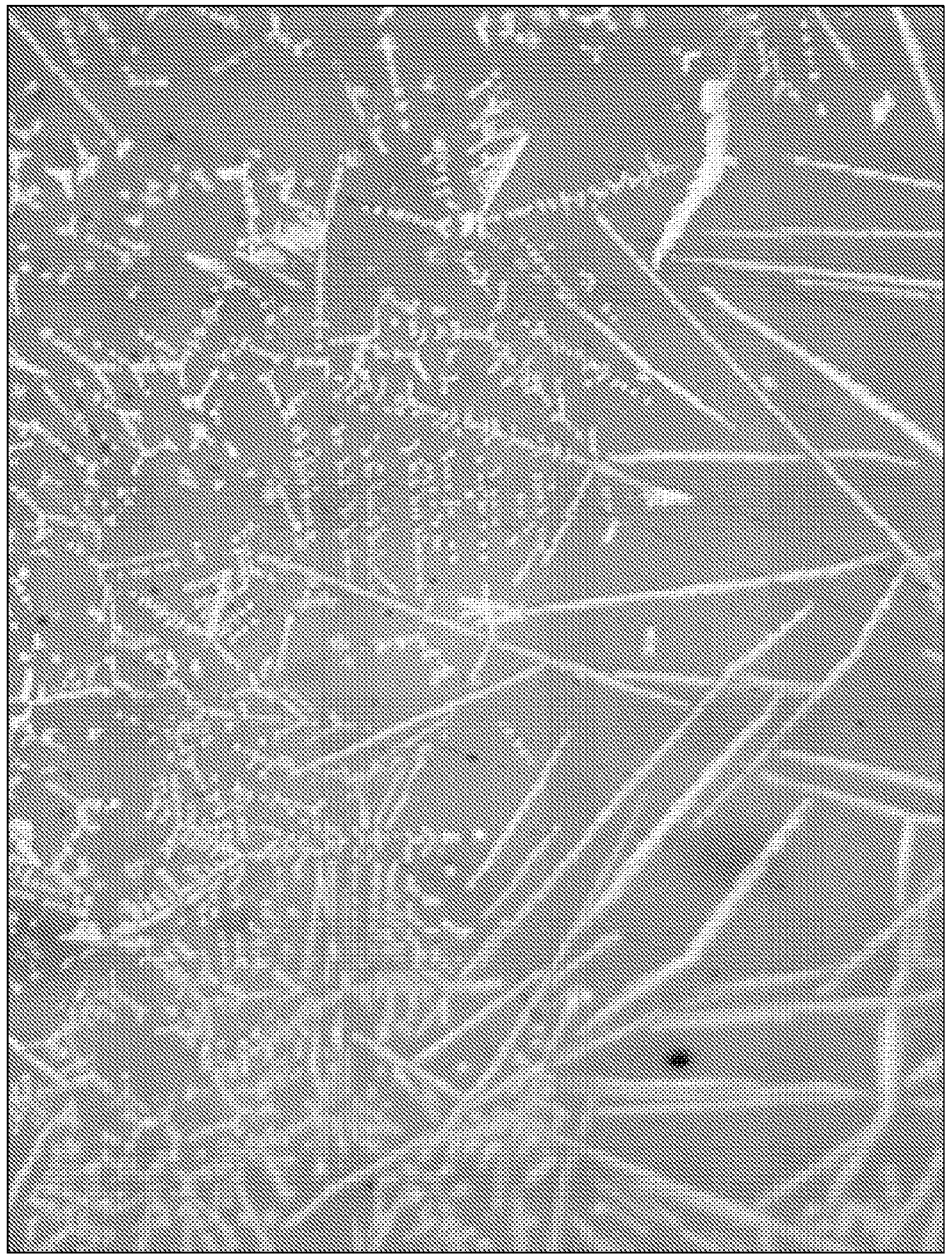
Figure 27:
Figure 29:
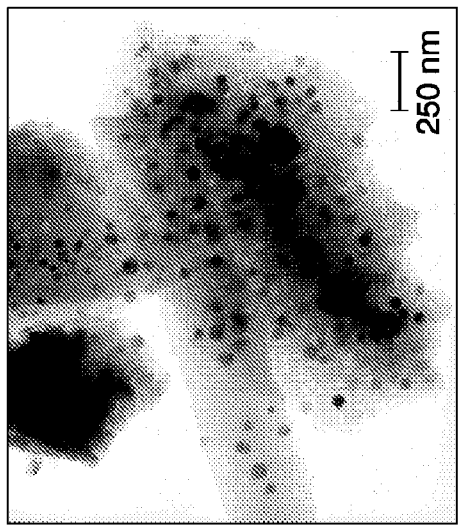
FIGS. 28-31 are photomicrographs of lunar soil simulant material.
Figure 31:
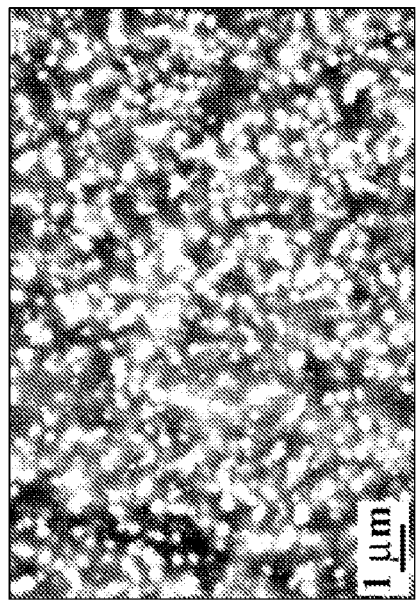
Figure 28:
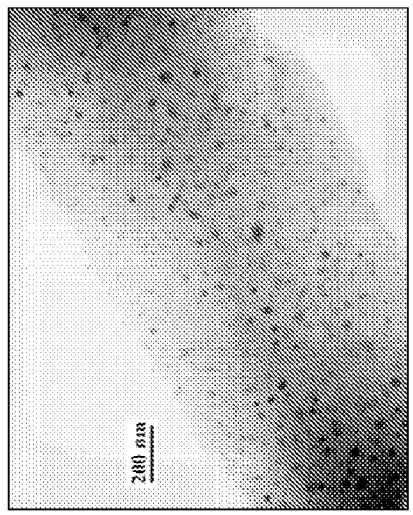
Figure 30:
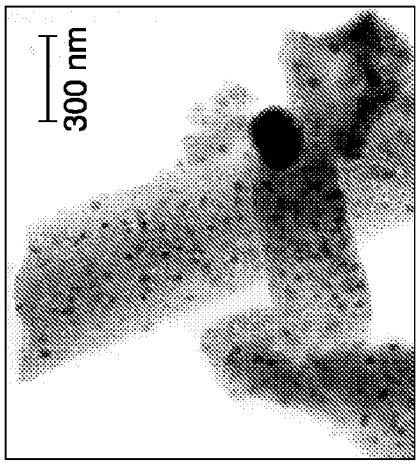

FIGS. 17-27 are photomicrographs of Apollo 17 lunar soil heated to different temperatures. In FIG. 17, the sample heated to 350° C. exhibited no melting. In FIG. 18, the sample heated to 400° C. exhibited pockets of incipient melt. In FIG. 19, the sample heated to 450° C. exhibited enlargement of the regions of the incipient melting. In FIG. 20, the sample heated to 500° C. exhibited glass from MW melt. In FIG. 21, another sample heated to 500° C. exhibited MW glass with partial digested minerals. In FIG. 22, a further sample heated to 500° C. also exhibited bubbles from escaping solar-wind gases. In FIG. 23, a sample to 600° C. exhibited contact of partial melt and sintered soil, with melting on the edges and between solid grains. In FIG. 24, another sample heated to 600° C. similarly exhibited contact of partial melt and sintered soil, with melting on edges and between solid grains. In the close-up view of FIG. 25, a sample heated to 600° C. exhibited MW glass with partial digested minerals and quench dendritic crystals of ilmenite. In FIG. 26, a sample heated to 1,750° C. exhibited quench crystals of ilmenite glass. In FIG. 27, another sample heated to 1,750° C. exhibited quench crystals of ilmenite in glass.

In accordance with an embodiment of the present invention a lunar soil stimulant may be produced. Lunar soil is dusty. Typically, over 95% is finer than 1 millimeter; about fifty percent is finer than 60 mm (the thickness of a human hair); and 10-20% is finer than 20 microns. The lunar soil particle-size distribution is very broad: 'well-graded' in geotechnical engineering terms, or very poorly sorted in geological terms.

In addition, because of the irregular, reentrant particle shapes, the specific surface area is high: approximately 0.5 m²/g. Lunar soil particles have about 8 times as much surface area as an assemblage of spheres with the equivalent particle size distribution. As a result of both of these factors, lunar soil particles do not pack together as efficiently as, for example, uniform spheres. Even when lunar soil is packed extremely tightly (by a combination of compression and eons of shaking by moonquakes), the porosity is roughly 40 to 50%, which is high by terrestrial standards.

Lunar rocks, from which the soil was formed, crystallized under such low partial pressures of oxygen (fugacity) that native iron ($Fe^0$) formed as one of the stable mineral phases in the lunar igneous rocks, e.g., mare basalts. During analyses of Apollo samples, the observation was made that the amount native $Fe^0$ in the lunar soils is about 10 times greater than in the rocks from which the soils were derived. At first, it was assumed that this extra Fe metal was from meteoritic sources. However, it was demonstrated that the amount of meteoritic contamination to the soil is only 1% at best, and the meteoritic Fe would be only a small fraction of that. On the Moon, an entirely different type of weathering process occurs than on Earth. It appears that the majority of the native $Fe^0$ in the lunar soil was formed by the auto-reduction of the FeO in silicate melts and vapors, as these were formed by micrometeorite impacts of the silicate minerals in the lunar soil. This reduction was caused by the abundance of solar-wind-implanted hydrogen on and near the surface of every soil particle. This effectively caused the FeO in the impact melt to be reduced to elemental $Fe^0$ that became supersaturated and nucleated homogeneously to produce myriads of single domain, nanophase-sized (3-33 nm) $Fe^0$ particles. This melt quenched, thereby forming the glass that binds together the aggregates of soil particles called agglutinates. Most of this fine-grained np-$Fe^0$ in the agglutinitic glass is not visible even with the best optical microscope. However, it is the formation and presence of this np-$Fe^0$ that is at the heart of both the deleterious and beneficial properties of the lunar soil.

The major weathering and erosional factors in the formation of lunar soil involve micrometeorite impacts. Larger soil particles are comminuted to finer ones. Silicate glass, formed by some impacts, welds together soil grains into glassy aggregates called agglutinates. Another set of processes that significantly affect lunar soils involve the additional formation of surface-correlated nanophase $Fe^0$, resulting from impact-induced vaporization and subsequent deposition of Fe- and Si-rich patinas on most soil particles, as well as sputter-deposited contributions. The average grain size of this nanophase $Fe^0$ is substantially less that that in agglutinitic glass such that it causes the major portion of space weathering effects that negatively affect reflectance spectra.

The amount of np-$Fe^0$ in a lunar soil may be measured by ferromagnetic residence (FMR) and designated as "$I_S$". In order to quantify the amount of iron in a sample that is present as np-$Fe^0$, the $I_S$ value is divided by the total $Fe^0$ content of the soil fraction under investigation. The value of $I_S/Fe^0$ is used as the maturity index for lunar soils. This value effectively shows the amount of np-$Fe^0$ that has been formed by the weathering processes, which is a function of the amount of agglutinates in the soil, which increases with exposure time at the surface of the Moon.

Due to the fragile and brittle nature of these glassy aggregates, the agglutinates are readily crushed. For a given mare soil, the abundance of agglutinitic glass increases significantly with decreasing grain size, as also evidenced by the $I_S/Fe^0$ values, which increase with decreasing grain size. The percentage increase in agglutinitic glass, from the larger grain sizes (20-35 microns) to the smaller size fractions (10-20 microns) is only on the order of 10-15%, whereas the $I_S/Fe^0$ values change by about 100%. That is, with a decrease in grain size, the change in agglutinitic glass content is relatively small compared with the change in $I_S/Fe^0$. The large increase in $I_S/Fe^0$ indicates the presence of another source of nanophase $Fe^0$, in addition to the agglutinitic glass.

The presence of nanophase $Fe^0$ in the vapor-deposited patinas (rims) on virtually all grains of a mature soil provides an additional and abundant source for the greatly increased $I_S/Fe^0$ values. For grain sizes of lunar soils less than 50 mm, the amount of np-$Fe^0$ on the surfaces is large, possibly equal to that in the agglutinitic glass in these fine grain sizes. The brownish patinas are clearly observable on the walls of large, exposed vesicles in melt breccias, and are temporarily removed locally by micrometeorite impacts.

Although the above-noted microwave experiments were conducted with real soil from the Moon, due to the limited availability of lunar soils collected from Apollo and Luna missions, it is desirable to produce materials that simulate this unique np-$Fe^0$ property for microwave experimentation, as well a for testing different dust mitigation methods using electromagnetic fields, techniques for recovery of solar-wind volatiles (e.g., hydrogen), and for reduction of lunar soil for the production of oxygen.

There are no conventional "lunar simulants" that have the specific properties of np-$Fe^0$ such that they may be used for microwave heating and sintering experiments. Two major lunar simulants exist: MLS-1 and JSC-1. The Minnesota lunar simulant (MLS-1) consists of crushed high-Ti diabase (basalt) from Duluth that has been crushed so as to approximately duplicate the particle-size distribution of Apollo 11 lunar soil. Portions of this crushed rock have been melted to simulate the large glass components of lunar soil. However, it must be realized that this Minnesota rock was chosen for a simulant only because it had high-Ti content and general composition similar to Apollo 11 soil. Its mineral chemistries were near that of the lunar phases, but they contain large amounts of $Fe^{3+}$, entirely atypical of lunar material.

It is the large amounts of agglutinitic (impact-generated) glass, typically >50%, that make the lunar soil so unusual compared with any terrestrial analogs. This was the impetus that caused the Johnson Space Center to establish lunar simulant JSC-1. This is a crushed volcanic tuff that consists of a large percentage of glass shards and angular grains that more closely approximates the physical abrasive properties of lunar soil, but not its chemistry. Thus, the two main lunar simulants used in the past by scientists and engineers worldwide only have some particular properties which are similar to lunar soil. There is presently no lunar soil simulant that has the nanophase $Fe^0$ properties that make experimentation with microwave radiation realistic to any degree.

Another lunar soil simulant has recently gone into production. It is similar to the previous JSC-1 simulant formed from crushed and ground welded volcanic tuff and is called JSC-1A. This lunar soil simulant has many of the mechanical and engineering properties of lunar soil, contains 50% glass, but does not have a typical lunar composition. However, it is presently the only NASA certified lunar simulant for research. Because it is terrestrial, it does not contain any nanophase metallic Fe.

We now appreciate the cause for the unique behavior of lunar soil with microwave radiation. This is an unusual property for any naturally occurring material on Earth. Basically, the minute sizes of the nanophase metallic Fe are small enough such as to be less than the "skin depth" of the microwave energy. This makes each of the metallic Fe grains into a conductor (versus a typical reflector), separated from the other metallic Fe particles by the dielectric glass. The conductor abilities of the metallic Fe act as an absorber of the microwave energy, thereby creating "energy sinks" with the effective generation of large quantities of heat.

Due largely to the presence of np-$Fe^0$ in lunar soil, the advantages of using microwave radiation for processing are significant. A comparison against normal conventional heating (large resistance-driven) shows that microwave heating of lunar soil has many distinct advantages: Rapid heating rates (>1,000°/min) to high temperatures (~2,000° C.); enhanced reaction rates (faster diffusion rates); faster sintering kinetics (shorter sintering times); lower sintering temperatures (energy savings); tailored microstructures (improved mechanical properties); considerably reduced processing time; and process simplicity.

In accordance with an embodiment of the present invention, it is possible to synthesize a "np-Fe additive" that can be added to JSC-1A to make a feedstock for microwave studies that will have the same approximate microwaveability as the real lunar soil. An additive consisting of np-Fe suspended in a glass has been synthesized. However, other additives may duplicate the lunar soil more closely for microwave purposes.

We have developed a method that can synthesize nano-sized metallic iron in amorphous silicate glasses with varying compositions. The method combines a sol-gel method with the impregnation method. The method for synthesizing a product of ($SiO_2$—Fe) and the method for a five-component product ($SiO_2$—$Al_2O_3$—MgO—CaO—Fe) are discussed below. The methods also can be adapted to generate thin-film coatings on mineral grains.

For the $SiO_2$—FeO system, starting materials include iron nitrate (Fe($NO_3$)$_3$.9$H_2O$) and a solution of pre-condensed silica (Silbond H-5), supplied by Silbond company. Silicon tetraethoxide (Si($OC_2H_5$)$_4$, TEOS) may also be used, but Silbond H-5 provides a faster synthesis time and smaller np-$Fe^0$ grain sizes. Silbond H-5 was mixed with an equal volume of ethanol solution (70 vol % EtOH), and the solution was magnetically stirred for 30 min. A catalyst solution, prepared by mixing ethanol, distilled water, and 30% $NH_4OH$ (volume ratio 1:1.2:0.007) was added slowly into the Silbond and ethanol solution. The gelation starts after 20-40 min and continues until fluidity has been reduced to a minimum after 30-90 min. Then an iron nitrate solution (pH=~2, adjusted using 0.1 M $NH_4OH$) was stirred into the soft gel, thereby breaking the gel into fragments. At this time, the mixture has a red brown color from $Fe^{3+}$ ions. The covered container was kept in a warm bath (~45° C.) for 2-3 days. After such aging, the extra liquid was removed by filtration. The soft orange gel fragments were dried with slowly increasing temperature from 40 to 100° C. over a period of about 2 days in order to remove the remaining water. Upon heating, the gel broke into even smaller pieces. Emphasis was not placed on maintaining any particular shape of the gel, since the goal was to make a soil-like material. The red brown fragments were then heated at ~350° C. for ~10 hours to further dry the sample, decompose the $NO_3^-$ and remove the resulting $NO_2$. The color of the amorphous materials changed to blackish brown.

FIGS. 28-31 are photomicrographs of lunar soil simulants produced by the above-noted method.

For the five-component system, starting materials include silicon tetraethoxide (TEOS), Si($OC_2H_5$)$_4$, aluminum nitrate (Al($NO_3$)$_3$.9$H_2O$), calcium nitrate (Ca($NO_3$)$_2$.4$H_2O$), magnesium nitrate (Mg($NO_3$)$_2$.6$H_2O$), and iron nitrate (Fe($NO_3$)$_3$.9$H_2O$). TEOS, 100% EtOH and distilled water were mixed in a volume ratio of 1:1:0.5. This solution was stirred for 30 min to ensure complete hydrolysis of TEOS. Then a hydrous solution of aluminum nitrate, calcium nitrate and magnesium nitrate was slowly added to the TEOS solution. After stirring for 1 h, the mixture was kept in warm water bath at ~60° C. until gelation. The gelation time depends on the amount of water in the solution and ranges from 3 hours to more than 6 hours. When the mixture lost its fluidity, a hydrous solution of iron nitrate was stirred into the viscous mixture. The mixture was left in a warm water bath at 45° C. for 2-3 days. After removing the extra liquid, the gel was dried at 100° C. and then heated at ~350° C. to decompose $NO^{3-}$. To generate metallic iron, samples were reduced for ~8 hours at ~900° C. for the binary product and ~4 h at ~700° C. for the five-component sample in a horizontal tube furnace under $H_2$ flow. The reduced sample has a black color and readily is attracted by a hand magnet. Soil simulants such as those produced as described above may be used for microwave testing, as well as many other purposes.

In addition to the above-noted embodiments, microwave heating of lunar soil may also have other applications. For example, another aspect of the present invention is to provide a method of heating the lunar soil at the polar regions of the Moon so as to release the possible water-ice that may be present. This may be accomplished by generating microwave energy and directing the microwave energy to the surface of the lunar soil to couple the energy with the nanophase metallic iron so as to generate heat. A further aspect of the present invention is to provide a method of heating the lunar soil by microwave energy application so as to have the soil release its solar-wind gases. A further aspect of the present invention is to provide a method of heating the lunar soil so as to facilitate chemical reactions leading to the production of lunar oxygen.

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus for in-situ microwave consolidation of soil particles, comprising:
    a microwave generator; and
    a plurality of waveguides structured and arranged to direct microwave energy from the microwave generator to a surface comprising the soil particles to thereby consolidate the soil particles, wherein the waveguides have different sizes selected based upon different microwave frequencies to be directed through the waveguides.

2. The apparatus of claim 1, wherein the microwave generator comprises a magnetron.

3. The apparatus of claim 1, further comprising a microwave funnel connected to the waveguide.

4. The apparatus of claim 3, wherein the microwave funnel is tapered.

5. The apparatus of claim 1, further comprising an impedance tuner mounted on the waveguide.

6. The apparatus of claim 1, comprising a plurality of the waveguides.

7. The apparatus of claim 6, wherein the waveguides have the same size.

8. The apparatus of claim 1, wherein the soil particles are lunar soil particles.

9. The apparatus of claim 8, wherein the lunar soil particles comprise nanophase metallic iron particles.

10. An apparatus for paving a surface comprising soil particles, comprising:
    a frame;
    a microwave generator mounted on the frame;

a plurality of waveguides structured and arranged to direct microwave energy from the microwave generator to a stationary surface comprising the soil particles, wherein the waveguides have different sizes selected based upon different microwave frequencies to be directed through the waveguides; and means for moving the waveguide with respect to the stationary surface.

11. The apparatus of claim 10, wherein the microwave generator comprises a magnetron.

12. The apparatus of claim 10, further comprising a microwave funnel connected to the waveguide.

13. The apparatus of claim 12, wherein the microwave funnel is tapered.

14. The apparatus of claim 10, further comprising an impedance tuner mounted on the waveguide.

15. The apparatus of claim 10, comprising a plurality of the waveguides.

16. The apparatus of claim 15, wherein the waveguides have the same size.

17. The apparatus of claim 10, further comprising a grading blade mounted on the frame.

18. The apparatus of claim 10, wherein the soil particles are lunar soil particles.

19. The apparatus of claim 18, wherein the soil particles comprise nanophase metallic iron particles.

20. The apparatus of claim 1, wherein the microwave generator operates at a first frequency, and further comprising a second microwave generator that operates at a second frequency different than the first frequency.

21. The apparatus of claim 10, wherein the microwave generator operates at a first frequency, and further comprising a second microwave generator that operates at a second frequency different than the first frequency.

* * * * *